(12) United States Patent  
Huang et al.

(10) Patent No.: US 12,103,886 B2  
(45) Date of Patent: Oct. 1, 2024

(54) ALUMINOSILICATE MICROCRYSTALLINE GLASS, AND MANUFACTURING METHOD AND PRODUCT THEREOF

(71) Applicant: Huawei Technologies Co., Ltd., Shenzhen (CN)

(72) Inventors: Kaiwen Huang, Dongguan (CN); Banghong Hu, Dongguan (CN); Wangchun Lyu, Dongguan (CN); Heshuai Si, Dongguan (CN); Zhongzhi Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 648 days.

(21) Appl. No.: 17/358,282

(22) Filed: Jun. 25, 2021

(65) Prior Publication Data

US 2021/0317032 A1    Oct. 14, 2021

Related U.S. Application Data

(63) Continuation of application No. PCT/CN2019/127236, filed on Dec. 21, 2019.

(30) Foreign Application Priority Data

Dec. 27, 2018   (CN) .......................... 201811632293.X (51) Int. Cl.
*C03C 10/00* (2006.01)
*C03B 32/02* (2006.01)
*C03C 21/00* (2006.01)

(52) U.S. Cl.
CPC .......... *C03C 10/0009* (2013.01); *C03B 32/02* (2013.01); *C03C 21/002* (2013.01)

(58) Field of Classification Search
None
See application file for complete search history.

(56) References Cited

U.S. PATENT DOCUMENTS 4,018,612 A    4/1977  Chyung
4,473,653 A    9/1984  Rudoi
(Continued)

FOREIGN PATENT DOCUMENTS

CN    104370469 A    2/2015
CN    104370470 A    2/2015
(Continued)

*Primary Examiner* — Eli D. Strah
(74) *Attorney, Agent, or Firm* — Conley Rose, P.C.

(57) ABSTRACT

Aluminosilicate microcrystalline glass, and a manufacturing method and a product thereof, where in addition to a glass phase, the aluminosilicate microcrystalline glass includes principal crystalline phases: a magnesium aluminate ($MgAl_2O_4$) crystal including a volume percentage of 5% to 30%, a lithium disilicate ($Li_2Si_2O_5$) crystal including a volume percentage of 10% to 30%, and a quartz and quartz solid solution including a volume percentage of 5% to 30%. Residues are other inevitable impurities. The inevitable impurities include intermediate products generated when the $MgAl_2O_4$ crystal, the $Li_2Si_2O_5$ crystal, or the quartz and quartz solid solution is being generated, other impurities that are inevitable in a glass production process, and the like.

20 Claims, 3 Drawing Sheets

(56) References Cited

U.S. PATENT DOCUMENTS

| | | | |
|---|---|---|---|
| 5,895,767 A | | 4/1999 | Yamaguchi et al. |
| 2013/0274085 A1 | | 10/2013 | Beall et al. |
| 2015/0030834 A1 | | 1/2015 | Morey et al. |
| 2018/0044225 A1 | | 2/2018 | Fan et al. |
| 2018/0194669 A1 | | 7/2018 | Ding et al. |
| 2021/0024405 A1 | * | 1/2021 | Yu .................. C03C 10/0027 |

FOREIGN PATENT DOCUMENTS

| | | | | |
|---|---|---|---|---|
| CN | 105293901 A | | 2/2016 | |
| CN | 105936588 A | | 9/2016 | |
| CN | 107840578 A | * | 3/2018 | ............ C03B 27/02 |
| EP | 0997445 A1 | | 5/2000 | |
| WO | 2012126394 A1 | | 9/2012 | |
| WO | WO-2020082328 A1 | * | 4/2020 | ............ C03C 10/00 |

\* cited by examiner

ALUMINOSILICATE MICROCRYSTALLINE GLASS, AND MANUFACTURING METHOD AND PRODUCT THEREOF

CROSS-REFERENCE TO RELATED APPLICATIONS

This application is a continuation of International Patent Application No. PCT/CN2019/127236 filed on Dec. 21, 2019, which claims priority to Chinese Patent Application No. 201811632293.X filed on Dec. 27, 2018. The disclosures of the aforementioned applications are hereby incorporated by reference in their entireties.

TECHNICAL FIELD

The present disclosure relates to the field of glass materials, and in particular, to aluminosilicate microcrystalline glass, and a manufacturing method and a product thereof.

BACKGROUND

Glass materials are widely used as materials of screen covers and exterior housings of various electronic devices. Compared with a conventional metal-plastic three-segment housing, a glass housing has obvious advantages in terms of component display, touch experience, appearance texture, and the like. In addition, a nature high transmittance and high hardness, a sense of technology and a high-grade appearance brought by decorability, and touch experience are naturally attractive to a terminal user. Therefore, for a same type of electronic products, the user is usually willing to pay more money to purchase a glass housing product with a high-grade appearance.

Various electronic products (such as a smartphone, a smartwatch, and a tablet computer) usually have communication functions. Especially, with Long-Term Evolution (LTE) Advanced Pro (4.5G)/fifth generation (5G) multi-antenna development, because metal materials have electromagnetic wave shielding performance and ceramic materials are relatively expensive, using glass as materials of a front screen and a back housing has become a trend, and therefore the glass materials are more widely used. However, the glass is brittle, and is likely to be scratched by other sharp objects in daily life. In addition, anti-falling strength of the glass is lower than that of another material. Consequently, anti-falling performance of the glass, especially a capability of anti-shattering on the rough ground, becomes a pain point in the industry.

SUMMARY

In view of this, embodiments of the present disclosure provide aluminosilicate microcrystalline glass, and a cover and a device to which the microcrystalline glass is applied. The microcrystalline glass is used as a material of a cover or a device housing, so that performance of the device cover and the device housing against sharp impact and scratching can be greatly improved.

According to a first aspect, the present disclosure provides transparent microcrystalline glass, including silicon dioxide ($SiO_2$) whose mass percentage is 55% to 80%, aluminum oxide ($Al_2O_3$) whose mass percentage is 5% to 20%, sodium oxide ($Na_2O$) whose mass percentage does not exceed 8%, magnesium oxide (MgO) whose mass percentage does not exceed 10%, titanium dioxide ($TiO_2$) whose mass percentage does not exceed 6%, potassium oxide ($K_2O$) whose mass percentage does not exceed 5%, lithium oxide ($Li_2O$) whose mass percentage does not exceed 10%, zirconium dioxide ($ZrO_2$) whose mass percentage does not exceed 5%, and phosphorus pentoxide ($P_2O_5$) whose mass percentage does not exceed 5%. A volume percentage of a glass phase in the microcrystalline glass is 25% to 95%, and a volume percentage of a magnesium aluminate ($MgAl_2O_4$) crystal is 5% to 75%. In the glass, an expansion coefficient of the $MgAl_2O_4$ nano-crystal is different from an expansion coefficient of the glass phase. Therefore, a compressive stress is generated inside the glass, and hardness of the glass is enhanced. In addition, ions sodium (Na) and lithium (Li) in the glass may be further used for chemical strengthening, to further enhance the hardness of the glass.

In an implementation of the first aspect, the microcrystalline glass further includes a lithium disilicate ($Li_2Si_2O_5$) crystal whose volume percentage does not exceed 30%, and a quartz and quartz solid solution whose volume percentage does not exceed 30%. $LiSi_2O_5$ stripe grains are bitten into each other inside the glass, and quartz spherical grains are dispersed, so that a path of a crack is bent when the crack passes through the crystal, thereby better hindering crack expansion and increasing an intrinsic strength of the glass.

In another implementation of the first aspect, the volume percentage of the $MgAl_2O_4$ crystal is 5% to 30%, the volume percentage of the $Li_2Si_2O_5$ crystal is 10% to 30%, and the volume percentage of the quartz and quartz solid solution is 5% to 30%.

In another implementation of the first aspect, the volume percentage of the $MgAl_2O_4$ crystal is 15% to 25%, the volume percentage of the $Li_2Si_2O_5$ crystal is 10% to 15%, and the volume percentage of the quartz and quartz solid solution is 10% to 20%.

With reference to any one of the first aspect or any implementations of the first aspect, a sum of the volume percentage of the $MgAl_2O_4$ crystal, the volume percentage of the $Li_2Si_2O_5$ crystal, and the volume percentage of the quartz and quartz solid solution is less than 50%.

With reference to any one of the first aspect or any implementations of the first aspect, the mass percentage of $SiO_2$ is 60% to 70%, the mass percentage of $Li_2O$ is 3% to 10%, the mass percentage of $Al_2O_3$ is 8% to 15%, the mass percentage of $TiO_2$ is 2% to 4.5%, the mass percentage of $ZrO_2$ is 1% to 2.5%, and the mass percentage of $P_2O_5$ is 1% to 2.5%. In addition, total content of $TiO_2$, $ZrO_2$, and $P_2O_5$ does not exceed 8%.

With reference to any one of the first aspect or any implementations of the first aspect, the microcrystalline glass further includes lanthanum oxide ($La_2O_3$) whose mass percentage does not exceed 1%.

With reference to any one of the first aspect or any implementations of the first aspect, a sum of the mass percentage of $Li_2O$ and the mass percentage of $K_2O$ is 3% to 12%.

With reference to any one of the first aspect or any implementations of the first aspect, a sum of the mass percentage of $SiO_2$ and the mass percentage of $Li_2O$ is 6 to 10 times the mass percentage of $Al_2O_3$. The sum of the mass percentage of $SiO_2$ and the mass percentage of $Li_2O$ is 7 to 9 times the mass percentage of $Al_2O_3$.

With reference to any one of the first aspect or any implementations of the first aspect, a sum of the mass percentage of $Al_2O_3$ and the mass percentage of $Li_2O$ is 9 to 15 times the mass percentage of $P_2O_5$. The sum of the mass percentage of $Al_2O_3$ and the mass percentage of $Li_2O$ is 10 to 13 times the mass percentage of $P_2O_5$.

In still another implementation of the first aspect, the volume percentage of the MgAl$_2$O$_4$ crystal is 10% to 60%, the volume percentage of the Li$_2$Si$_2$O$_5$ crystal is less than 5%, and the volume percentage of the quartz and quartz solid solution is less than 5%.

Optionally, the mass percentage of Li$_2$O does not exceed 3%, the mass percentage of Al$_2$O$_3$ is 10% to 15%, the mass percentage of TiO$_2$ is 2% to 6%, the mass percentage of ZrO$_2$ does not exceed 1%, the mass percentage of P$_2$O$_5$ does not exceed 1%, the mass percentage of MgO is 5% to 9%, and the mass percentage of Na$_2$O is 3% to 8%.

With reference to any one of the first aspect or any implementations of the first aspect, the microcrystalline glass further includes antimony(III) oxide (Sb$_2$O$_3$) whose mass percentage does not exceed 2%. The mass percentage of Sb$_2$O$_3$ does not exceed 1%.

With reference to any one of the first aspect or any implementations of the first aspect, the microcrystalline glass further includes boron oxide (B$_2$O$_3$) whose mass percentage does not exceed 5%. The mass percentage of B$_2$O$_3$ does not exceed 2%.

With reference to any one of the first aspect or any implementations of the first aspect, the microcrystalline glass further includes one or more of calcium oxide (CaO), strontium oxide (SrO), zinc oxide (ZnO), and barium oxide (BaO). When the microcrystalline glass includes CaO, a mass percentage of CaO does not exceed 3%, when the microcrystalline glass includes SrO, a mass percentage of SrO does not exceed 3%, when the microcrystalline glass includes ZnO, a mass percentage of ZnO does not exceed 5%, and when the microcrystalline glass includes BaO, a mass percentage of BaO does not exceed 5%. A sum of the mass percentage of CaO, the mass percentage of SrO, the mass percentage of ZnO, and the mass percentage of BaO does not exceed 5%. When the microcrystalline glass includes CaO, the mass percentage of CaO does not exceed 1.5%, when the microcrystalline glass includes SrO, the mass percentage of SrO does not exceed 1%, when the microcrystalline glass includes ZnO, the mass percentage of ZnO does not exceed 2%, and when the microcrystalline glass includes BaO, the mass percentage of BaO does not exceed 1%.

With reference to any one of the first aspect or any implementations of the first aspect, the mass percentage of MgO is 0.4 to 1 time the mass percentage of Al$_2$O$_3$. The mass percentage of MgO is 0.5 to 0.8 times the mass percentage of Al$_2$O$_3$.

With reference to any one of the first aspect or any implementations of the first aspect, a sum of the mass percentage of TiO$_2$ and the mass percentage of ZrO is less than or equal to the mass percentage of MgO.

With reference to any one of the first aspect or any implementations of the first aspect, a sum of the mass percentage of Al$_2$O$_3$ and the mass percentage of MgO is 3 to 8 times the mass percentage of TiO$_2$. The sum of the mass percentage of Al$_2$O$_3$ and the mass percentage of MgO is 4 to 6 times the mass percentage of TiO$_2$.

With reference to any one of the first aspect or any implementations of the first aspect, residues are other inevitable impurities.

According to a second aspect, the present disclosure provides a transparent microcrystalline glass cover, and the transparent microcrystalline glass cover is made from one or more crystalline phases of the microcrystalline glass according to any one of the first aspect or any implementations of the first aspect.

In an implementation of the second aspect, a four-bar bending strength of the cover is not less than 600 megapascals (MPa), a transmittance is not less than 80%, a haze is not greater than 0.6%, a compressive stress is not less than 250 MPa, a compressive stress depth is not less than 40 micrometers (m), and a fracture toughness is not less than 1 MPa·square-root-meters (MPa·m$^{1/2}$).

In another implementation of the second aspect, the four-bar bending strength of the cover is not less than 750 MPa, the transmittance is not less than 89%, the haze is not greater than 0.4%, the compressive stress is not less than 500 MPa, the compressive stress depth is not less than 80 μm, and the fracture toughness is not less than 1.2 MPa·m$^{1/2}$.

According to a third aspect, the present disclosure provides an apparatus, including a housing and at least one component. The housing forms accommodation space, and the at least one component is accommodated in the accommodation space. Some or all materials of the housing are one or more crystalline phases of the transparent microcrystalline glass according to any one of the first aspect or the implementations of the first aspect.

In an implementation of the third aspect, a four-bar bending strength of the housing is not less than 600 MPa, a transmittance is not less than 80%, a haze is not greater than 0.6%, a compressive stress is not less than 250 MPa, a compressive stress depth is not less than 40 μm, and a fracture toughness is not less than 1 MPa·m$^{1/2}$.

In another implementation of the third aspect, the four-bar bending strength of the housing is not less than 750 MPa, the transmittance is not less than 89%, the haze is not greater than 0.4%, the compressive stress is not less than 500 MPa, the compressive stress depth is not less than 80 μm, and the fracture toughness is not less than 1.2 MPa·m$^{1/2}$.

According to a fourth aspect, this application provides a transparent microcrystalline glass production method, including proportioning ingredients based on component mass fractions of the transparent microcrystalline glass in any implementation of the first aspect, smelting and clarifying the ingredients at a temperature of 1300 degrees Celsius (° C.) to 1700° C., to obtain a high-temperature glass raw liquid, removing bubbles and foreign matter from the high-temperature glass raw liquid, forming the high-temperature glass raw liquid from which the bubbles and the foreign matter are removed into a glass body by using one of a press-and-delay method, a melt casting method, a float method, a melt overflow method, and a sintering method, performing coarse annealing on the glass body at a temperature of 400° C. to 800° C., nucleating, through thermal processing for 0.5 to 1 hour at a temperature of 500° C. to 600° C., the glass body obtained after coarse annealing, and performing crystallization on the nucleated glass body through thermal processing for 0.5 to 1 hour at a temperature of 650° C. to 800° C., to obtain transparent microcrystalline glass.

Optionally, cold machining and polishing may be performed on the transparent microcrystalline glass by using a numerical control machine tool.

Optionally, chemical ion strengthening may be performed on the transparent microcrystalline glass.

DESCRIPTION OF EMBODIMENTS

According to aluminosilicate microcrystalline glass provided in the embodiments of the present disclosure, microcrystallization processing is performed on aluminosilicate glass, so that micro grains are generated through crystallization inside the glass, and the formed grains are dispersed in a glass phase. Therefore, a fracture toughness of the glass is increased, so that the glass can resist relatively large energy impact and weaken crack propagation scalability. In addition, an elastic modulus and surface hardness of the glass increase with addition of crystals. Therefore, when the glass is subject to stress impact, a strain and a deformation become smaller, thereby further weakening the crack propagation scalability. Moreover, chemical strengthening may be further performed on the glass, and mechanical performance of the glass is further enhanced through ion exchange. Main chemical components of the microcrystalline glass are shown in Table 1:

TABLE 1

| Components | First mass percentage (or mass fraction) n | Second mass percentage (or mass fraction) n | Third mass percentage (or mass fraction) n |
|---|---|---|---|
| $SiO_2$ | 55% ≤ n ≤ 80% | 60% ≤ n ≤ 70% | 55% ≤ n ≤ 80% |
| $Al_2O_3$ | 5% ≤ n ≤ 20% | 8% ≤ n ≤ 15% | 10% ≤ n ≤ 15% |
| $Na_2O$ | 0 < n ≤ 8% | 3% ≤ n ≤ 7% | 3% ≤ n ≤ 8% |
| MgO | 0 < n ≤ 10% | 5% ≤ n ≤ 9% | 5% ≤ n ≤ 9% |
| $TiO_2$ | 0 < n ≤ 6% | 2% ≤ n ≤ 4.5% | 2% ≤ n ≤ 6% |
| $K_2O$ | 0 < n ≤ 5% | 0 < n ≤ 5% | 0 < n ≤ 5% |
| $Li_2O$ | 0 < n ≤ 10% | 3% ≤ n ≤ 10% | 0 < n ≤ 3% |
| $ZrO_2$ | 0 < n ≤ 5% | 1% ≤ n ≤ 2.5% | 0 < n ≤ 1% |
| $P_2O_5$ | 0 < n ≤ 5% | 1% ≤ n ≤ 2.5% | 0 < n ≤ 1% |
| $Sb_2O_3$ | 0 < n ≤ 2% | 0 < n ≤ 1% | 0 < n ≤ 1% |
| $B_2O_3$ | 0 < n ≤ 5% | 0 < n ≤ 2% | 0 < n ≤ 2% |
| $La_2O_3$ | 0 < n ≤ 1% | 0 < n ≤ 1% | n = 0% |

In Table 1, both the second and the third mass percentages (or mass fractions) of each component in the microcrystalline glass except $La_2O_3$ fall within a range of the first mass percentage (or mass fraction). It should be noted that Table 1 lists only three most typical mass percentage combinations. This does not constitute a special limitation on the embodiments of this application. Possible solutions obtained by combining component content of different substances in different columns in Table 1 (for example, some substances use the first mass percentage, and some other substances use the second mass percentage) still fall within the protection scope of the embodiments of this application.

In implementations with the first and the second chemical component percentages, in addition to the glass phase, the aluminosilicate microcrystalline glass includes a crystalline phase an $MgAl_2O_4$ crystal, and may further include a $Li_2Si_2O_5$ crystal, a quartz and quartz solid solution, and other inevitable impurities. The inevitable impurities may include intermediate products generated when the $MgAl_2O_4$ crystal, the $Li_2Si_2O_5$ crystal, or the quartz and quartz solid solution is being generated, other impurities that are inevitable in a glass production process, and the like. According to the microcrystalline glass, a difference between an expansion coefficient of a nano-crystal and an expansion coefficient of the glass phase is used to generate a compressive stress inside the glass. The $MgAl_2O_4$ nano-crystal grain is mainly used to increase hardness of the glass, $LiSi_2O_5$ stripe grains are bitten into each other inside the glass, and quartz spherical grains are dispersed, so that a path of a crack is bent when the crack passes through the crystal, thereby better hindering crack expansion and increasing intrinsic strength of the glass. In addition, ions Li and Na in the glass may be further used for subsequent chemical strengthening, to further enhance mechanical performance of the glass.

In an implementation with the third chemical component percentage, in addition to the glass phase, the aluminosilicate microcrystalline glass includes a principal crystalline phase an $MgAl_2O_4$ crystal, and includes only a relatively small quantity of $Li_2Si_2O_5$ crystals and quartz and quartz solid solutions or even no $Li_2Si_2O_5$ crystal and quartz and quartz solid solution. In addition, the crystalline phase may further include some other inevitable impurities, for example, intermediate products generated when the $MgAl_2O_4$ crystal, the $Li_2Si_2O_5$ crystal, or the quartz and quartz solid solution is being generated, other impurities that are inevitable in a glass production process, and the like. According to the microcrystalline glass, a difference between an expansion coefficient of the $MgAl_2O_4$ nano-crystal and an expansion coefficient of the glass phase is used to generate a compressive stress inside the glass. In addition, a relatively large quantity of remaining ions Li and Na in the glass may be used for subsequent chemical strengthening, to further enhance mechanical performance of the glass.

The following describes functions of the components and various mass percentages (or mass fractions) of the components in the embodiments with different formulations of the microcrystalline glass.

$SiO_2$ is a necessary component for forming a glass mesh structure of the microcrystalline glass of the present disclosure, and is also a necessary component for generating a $LiSi_2O_5$ crystalline phase by performing thermal processing on the glass. In a case in which another condition is met, when content of $SiO_2$ is 55% to 80%, the $LiSi_2O_5$ crystal can be generated effectively. When the content is 60% to 70%, it is more favorable to increase the intrinsic mechanical strength of the glass, especially the elastic modulus, and is more favorable to precipitate the $LiSi_2O_5$ crystal and a quartz crystal, thereby further increasing a mechanical strength.

$Al_2O_3$ is a necessary component for forming the glass mesh structure of the microcrystalline glass of the present disclosure, and $Al_2O_3$ can improve mechanical performance and chemical stability of a product. If content of $Al_2O_3$ is very low, the intrinsic strength is relatively low. However, if the content is too much, it is difficult to melt the glass and it is easy to precipitate impurities such as petalite and pseudo-sapphire grains, and consequently the intrinsic strength of the glass is reduced. When the content of $Al_2O_3$ is 5% to 20%, a production requirement of the microcrystalline glass in the embodiments of this application can be met. When the content is 8% to 15%, it is more favorable to chemical tempering of the glass, and fewer impurities are precipitated, thereby increasing the intrinsic strength of the glass.

$Na_2O$ can promote melting of the glass, reduce a smelting temperature of the glass, and reduce a softening point of the glass. In addition, $Na_2O$ is also an important component for chemical strengthening of the glass. When content of $Na_2O$ is very low, quality of subsequent chemical strengthening is affected. When the content is too much, crystallization is inhibited, which is unfavorable to formation of a principal crystalline phase. $Na_2O$ whose mass fraction is 0% to 8% can meet the foregoing requirement in a microcrystalline glass production process. When the content of $Na_2O$ is 3% to 7%, the melting temperature and the softening point of the glass can be effectively reduced, so that subsequent chemical strengthening can achieve a better effect, and the crystallization can be less inhibited.

MgO helps to reduce viscosity of the glass, inhibit crystallization of original glass during molding, and improve low-temperature meltability. MgO is an important component for forming an $MgAl_2O_4$ nano-crystal nucleus of the microcrystalline glass (a grain size is less than 15 nm). When content is greater than 0% and less than or equal to 10%, the production requirement can be met. When the content of MgO content is 5% to 9%, $MgAl_2O_4$ and quartz crystals are generated after thermal processing.

$TiO_2$ is a nucleating agent of the microcrystalline glass. When $TiO_2$ is used together with a nucleating agent such as MgO, crystals such as $MgAl_2O_4$ grown in the microcrystalline glass may increase, and become smaller, thereby enhancing the mechanical performance. When content of $TiO_2$ is too much, glass coloring is caused, and consequently optical performance of the glass is affected. When the content of $TiO_2$ is less than 6%, a nucleation enhancement requirement can be met, and no obvious coloring effect is caused. When the content is not less than 2%, a nucleation effect can be better enhanced. When the content is not greater than 4.5%, the coloring effect of the glass is less affected.

$K_2O$ can reduce the melting temperature of the glass, facilitate melting and molding, and improve melting quality and optical performance of the glass. Too much content may reduce crystallization performance, and affect the glass strength. When the content does not exceed 5%, glass performance can be effectively supported.

$Li_2O$ is a necessary component for forming a required $Li_2Si_2O_5$ crystalline phase (a grain size is usually 30 nanometers (nm) to 200 nm) through thermal processing, and is also a mandatory component for performing chemical tempering on the microcrystalline glass in the present disclosure through ion exchange. In addition, low-temperature smelting and molding performance of the glass can also be improved. When the content is less than 3%, a magnesium-aluminum spinel phase is mainly precipitated for the glass, and a small quantity of $Li_2Si_2O_5$ crystals may be precipitated. In addition, the ion Li can participate in subsequent chemical strengthening, so that the intrinsic strength and fracture toughness of the glass are better than those of common glass. When the content is 3% to 10%, more $Li_2Si_2O_5$ crystals are precipitated, so that the mechanical strength of the glass is further increased, and obvious devitrification does not occur due to a very large grain. When the content is greater than 10%, a coarse $Li_2Si_2O_5$ grain may be formed in a principal crystalline phase of the glass, a haze increases, and the glass is prone to devitrification.

$ZrO_2$ may be used as a nucleating agent of the microcrystalline glass, so that grown crystals of the microcrystalline glass increase and become smaller, thereby better promoting the mechanical performance and chemical stability of the microcrystalline glass. In addition, the fracture toughness of the microcrystalline glass is increased by using a phase transformation mechanism of $ZrO_2$. When content does not exceed 5%, the production requirement of the microcrystalline glass in this application can be well met. When the content is greater than 0% and not more than 1%, formation of the $MgAl_2O_4$ crystal can be promoted, a crystal volume can be reduced, and the mechanical strength of the glass can be increased. When the content is 1% to 2.5%, formation of both the $MgAl_2O_4$ crystal and the $Li_2Si_2O_5$ crystal can be effectively supported, and a grain size is maintained to be within a proper range. When the content is greater than 5%, there are more grains, which makes the glass more sensitive to a thermal bending effect and consequently reduces stability of the microcrystalline glass.

$P_2O_5$ is a nucleating agent of the microcrystalline glass. Less content indicates less nucleation in the glass and fewer crystals formed in the glass. More content indicates more nucleation in the glass and a larger grain. When the content does not exceed 5%, the production requirement of the microcrystalline glass in this application can be well met. When the content is greater than 0% and less than 1%, formation of the $MgAl_2O_4$ crystal can be promoted, and the mechanical strength of the glass can be increased. When the content is 1% to 2.5%, formation of both the $MgAl_2O_4$ crystal and the $Li_2Si_2O_5$ crystal can be effectively supported, and a grain size is maintained to be within a proper range. When the content is greater than 5%, there are more grains and the grains are very large, which makes the glass more sensitive to a thermal bending effect and consequently reduces stability of the microcrystalline glass.

$Sb_2O_3$ is a fining agent of the glass, and is used to reduce viscosity of a glass liquid in a glass melting process, so as to remove bubbles in the glass liquid. Generally, content is less than or equal to 2%, and in some implementations is less than or equal to 1%.

$B_2O_3$ is an intermediate of the glass, and is used to facilitate smelting and reduce a splicing temperature. In addition, boron-oxygen (B—O) bond energy is greater than silicon-oxygen (Si—O) bond energy. Therefore, the glass is more stable. Generally, content is less than or equal to 5%, and in some implementations is less than or equal to 2%.

$La_2O_3$ is mainly used to inhibit precipitation of a $Li_2SiO_3$ crystal, so that more $Li_2Si_2O_5$ crystals can be formed in the glass. When there is no $La_2O_3$, the $Li_2Si_2O_5$ crystal in the glass is naturally crystallized, and a process product $Li_2SiO_3$ crystal is formed. When there is $La_2O_3$ and content does not exceed 1%, formation of $Li_2SiO_3$ can be effectively inhibited, and crystallization crystals are mostly $Li_2Si_2O_5$ crystals. When the content of $La_2O_3$ is greater than 1%, precipitation of another crystalline phase may also be inhibited, and consequently the mechanical strength of the glass is affected. Generally, proper content of $La_2O_3$ is helpful to increase the fracture toughness of the microcrystalline glass.

In the foregoing implementation with the first, the second, or the third mass percentage and in another possible implementation, the microcrystalline glass may further include one or more of CaO, SrO, ZnO, or BaO, to serve as a co-solvent, thereby helping glass melting and improving thermal stability and chemical stability of the glass. When the foregoing four compounds exist in the microcrystalline glass, content of BaO does not exceed 5%, and in some implementations does not exceed 1%, content of ZnO does not exceed 5%, and in some implementations does not exceed 2%, content of CaO does not exceed 3%, and in some implementations does not exceed 1.5%, and content of SrO does not exceed 3%, and in some implementations not exceed 1%. Total content of CaO, SrO, ZnO and BaO generally does not exceed 5%.

In some possible implementations, based on the foregoing implementations with the first and the second chemical component percentages, some component content in the glass may further meet the following several relationships.

A sum of the mass percentage (or the mass fraction) of $Li_2O$ and the mass percentage (or the mass fraction) of $K_2O$ in the glass may be 3% to 12%. High content of $Li_2O$ and $K_2O$ reduces crystallization performance and affect the glass strength. However, if the content is very low, it is difficult to form the $Li_2Si_2O_5$ crystalline phase, which is not conducive to ion exchange during subsequent chemical strengthening and affects chemical strengthening.

A sum of the mass percentage (or the mass fraction) of $SiO_2$ and the mass percentage (or the mass fraction) of $Li_2O$ in the glass may be 6 to 10 times the mass percentage (or the mass fraction) of $Al_2O_3$, and in some implementations may also be 7 to 9 times. $SiO_2$ is a main body for forming a glass network structure, and a ratio of the foregoing components in a proper ratio range is favorable to form $Li_2Si_2O_5$. If the ratio is too small, an impurity phase such as petalite is easily formed. If the ratio is too large, the content of $Al_2O_3$ is relatively low, which is not conducive to ion exchange in subsequent chemical strengthening and reduces the glass strength.

A sum of the mass percentage (or the mass fraction) of $Al_2O_3$ and the mass percentage (or the mass fraction) of $Li_2O$ in the glass may be 9 to 15 times the mass percentage (or the mass fraction) of $P_2O_5$, and in some implementations may be 10 to 13 times. If the ratio is very large, the content of $P_2O_5$ is relatively low, and kinetic energy for forming the $Li_2Si_2O_5$ crystalline phase is insufficient. Consequently, the content is reduced, and the mechanical performance of the glass is affected. If the ratio is too small, the content of $P_2O_5$ is too much, and the content of the $Li_2Si_2O_5$ crystal is too much. Consequently, the haze of the glass increases, and the glass is prone to devitrification. A proper range is helpful to form a proper crystal percentage, optimize the glass network structure, and facilitate ion exchange during chemical strengthening.

A volume percentage of the $MgAl_2O_4$ crystal in the glass may be 5% to 30%, and in some implementations may be 15% to 25%. A volume percentage of the $Li_2Si_2O_5$ crystal may be 10% to 30%, and in some implementations may be 10% to 15%. A volume percentage of the quartz and quartz solid solution may be 5% to 30%, and in some implementations may be 10% to 20%. A sum of the volume percentage of the $MgAl_2O_4$ crystal, the volume percentage of the $Li_2Si_2O_5$ crystal, and the volume percentage of the quartz and quartz solid solution may be less than 75%, and in some implementations may be less than 50%. A fine spinel $MgAl_2O_4$ can increase the hardness and elastic modulus of the glass in a proper content range. In addition, the $Li_2Si_2O_5$ crystal has a relatively large expansion coefficient and is in a long strip shape, and a compressive stress is generated to increase the glass strength. A quartz crystal is in a spherical shape and dispersed in all crystals, which helps increase the fracture toughness of the glass. A proper content combination range is helpful to achieve balance between the transmittance and the strength. If the three crystalline phases each have very low content, the mechanical strength of the glass may be reduced. If the three crystalline phases each have too much content, the transmittance of the glass may be affected. In addition, there are few ions that may be used for chemical strengthening, which is not conducive to chemical strengthening.

In some possible implementations, based on the foregoing implementation with the first, the second, or the third chemical component percentages, or based on the other possible implementation above, some component content in the glass may further meet the following relationships.

A mass percentage (or a mass fraction) of MgO may be 0.4 to 1 time the mass percentage (or the mass fraction) of $Al_2O_3$, and in some implementations may be 0.5 to 0.8 times. When the ratio is in a proper interval, a proper quantity of magnesium-aluminum spinels is formed, and there is an extra $Al_2O_3$ glass phase, which is conducive to ion exchange.

A sum of a mass percentage (or a mass fraction) of $TiO_2$ and a mass percentage (or a mass fraction) of ZrO is less than or equal to the mass percentage (or the mass fraction) of MgO. $TiO_2$ and ZrO, as compound nucleating agents, can effectively promote formation of spinel nucleation with proper content, thereby improving the glass structure and facilitating ion exchange. However, when the content of $TiO_2$ and ZrO is too much, glass coloring is easily caused, and optical performance of the glass is affected.

A sum of the mass percentage of $Al_2O_3$ and the mass percentage of MgO may be 3 to 8 times the mass percentage of $TiO_2$, and in some implementations may be 4 to 6 times. When the content of $TiO_2$ is in a proper range, $TiO_2$ is used as a nucleating agent, so that the $MgAl_2O_4$ crystal is easily formed in the glass. If the ratio is very low, the glass is easy to color and lose permeability. If the ratio is very high, the content of the $MgAl_2O_4$ crystalline phase is low and the grain size is large, which affects the optical performance of the glass.

In the foregoing embodiments, the microcrystalline glass may further include one or more of crystals such as magnesium aluminum silicates ($Mg_{3.5}Al_9Si_{1.5}O_{20}$, $Mg_2Al_4Si_5O_{18}$), lithium metasilicate ($Li_2SiO_3$), lithium titanates ($Li_2TiO_3$, $Li_4Ti_5O_{12}$), lithium aluminum silicates ($LiAlSi_2O_6$, $LiAlSi_4O_{10}$), sodium silicate ($Na_2SiO_3$), sodium titanates ($Na_2TiO_3$, $Na_4Ti_5O_{12}$), and sodium aluminum silicate ($NaAlSi_2O_6$). The foregoing substances may be considered as impurities in the microcrystalline glass provided in this embodiment of this application.

An embodiment of this application further provides a transparent microcrystalline glass cover, and the transparent microcrystalline glass cover is made from any one or more crystalline phases of the transparent microcrystalline glass in the foregoing embodiments. A four-bar bending strength of the microcrystalline glass cover is not less than 600 MPa, a transmittance is not less than 80%, a haze is not greater than 0.6%, a compressive stress is not less than 250 MPa, a compressive stress depth is not less than 40 μm, and a fracture toughness is not less than 1 MPa·m$^{1/2}$.

An embodiment of this application further provides another transparent microcrystalline glass cover, and the transparent microcrystalline glass cover is made from any one or more crystalline phases of the transparent microcrystalline glass in the foregoing embodiments. A four-bar bending strength of the microcrystalline glass cover is not less than 750 MPa, a transmittance is not less than 89%, a haze is not greater than 0.4%, a compressive stress is not less than 500 MPa, a compressive stress depth is not less than 80 μm, and a fracture toughness is not less than 1.2 MPa·m$^{1/2}$.

An embodiment of this application further provides an apparatus, including a housing and at least one component. The housing forms accommodation space, and the at least one component is accommodated in the accommodation space. Some or all materials of the housing are any one or more of crystalline phases of the transparent microcrystalline glass or the transparent microcrystalline glass cover in the foregoing embodiments.

The apparatus may include a mobile terminal device, a storage apparatus, an intelligent wearing device, a personal healthcare apparatus, an electronic dictionary, an electronic learning machine, a personal electronic apparatus, a camera, a household appliance, an electronic toy, a game console, a beauty instrument, a healthcare instrument, a massage instrument, a physiotherapy device, an air purifier, a bicycle, a self-balancing scooter, an exercise apparatus, various speakers, or the like.

The mobile terminal device may include a mobile phone, a notebook computer, a tablet computer, a personal computer, a point of sale (POS) machine, a vehicle-mounted computer, a dashcam, Moving Picture Experts Group (MPEG) Audio Layer 3 (MP3) player, MPEG-4 Part 14 (MP4) player, a personal entertainment electronic apparatus, an e-book reader, a router, a set-top box, a projector, an electronic album, or the like. The mobile phone includes a smartphone, a feature phone, or the like.

The storage apparatus includes a Universal Serial Bus (USB) flash drive, a removable hard disk, a memory card, or the like.

The intelligent wearing device includes a smart band, a smartwatch, smart glasses, or the like.

A specific example of the apparatus is described below by using an example.

Figure 1:
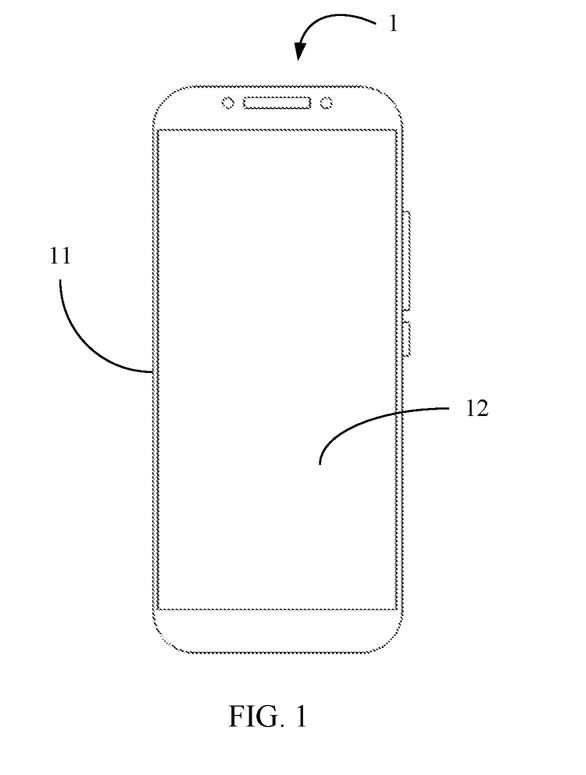
FIG. 1 is a schematic diagram of a front view of an embodiment of a mobile phone product according to an embodiment of the present disclosure.
Figure 2:
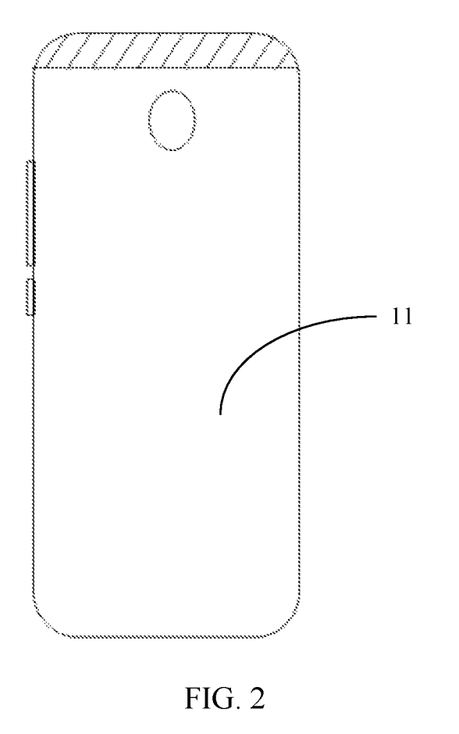
FIG. 2 is a schematic diagram of a back view of an embodiment of a mobile phone product according to the present disclosure.

As shown in FIG. 1 and FIG. 2, when the apparatus is a mobile phone 1, the components include at least a circuit board, a battery, an antenna, and a screen 12 (or a display screen). A rear housing 11 and the screen 12 are fastened on an outer surface of the mobile phone 1, to form a housing and form accommodation space. Both the rear housing 11 and the screen 12 may use any one or more of crystalline phases of the transparent microcrystalline glass described in this embodiment of this application. The circuit board and the battery are accommodated in the accommodation space, and the antenna is accommodated in the accommodation space or protrudes outside the housing 11. FIG. 1 shows a front facet of the mobile phone 1, and FIG. 2 is a schematic diagram of the rear housing 11 on the back of the mobile phone 1.

Figure 3:
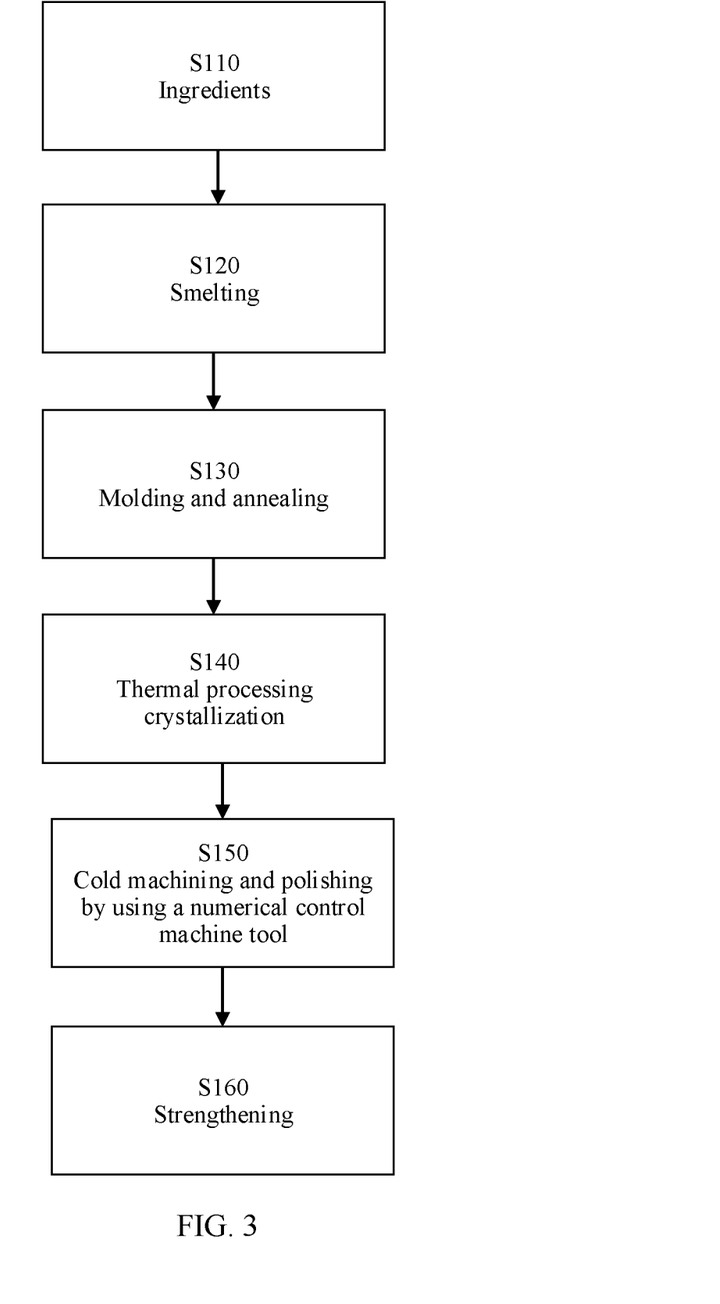
FIG. 3 is a schematic flowchart of an aluminosilicate microcrystalline glass production method according to the present disclosure.

FIG. 3 shows a transparent microcrystalline glass cover production process according to an embodiment of this application.

S110: Ingredients. Raw materials are weighed based on the weight proportions shown in Table 1, the materials are put into a mixing machine, and the materials are evenly mixed into glass raw materials.

S120: Smelting. The foregoing precursor glass raw materials are put into a smelting furnace, smelting and clarifying are performed at a high temperature of 1300° C. to 1700° C., and the glass raw materials are dissolved into a high-temperature glass raw liquid. In addition, bubbles and foreign matter are removed from the high-temperature glass raw liquid.

S130: Molding and annealing. The smelted high-temperature glass raw liquid is formed into a glass body at a specific out-of-furnace temperature by using a press-and-delay method, a melt casting method, a float method, a melt overflow method, a sintering method, or the like. After molding, coarse annealing (400° C. to 800° C.) is performed.

S140: Thermal processing crystallization. The glass obtained after coarse annealing is placed in a high-temperature furnace for thermal processing, the glass is nucleated at a low temperature of 500° C. to 600° C. and is crystallized at a high temperature of 650° C. to 800° C. in phases respectively for 0.5 to 10 hours, a structure in which a plurality of microcrystals and the glass body are mixed is formed inside glass materials, where a grain size is 4 nm to 200 nm, and high-hardness transparent microcrystalline glass whose transmittance is 80% to 92% is obtained.

S150: Cold machining and polishing by using a numerical control machine tool. The block microcrystalline glass material is cut by using a molybdenum wire, the molybdenum wire is plated with a diamond film, and a thickness residue of 0.1 to 0.25 mm is reserved for cutting (which may also be adjusted to cutting first and crystallization and polishing second). #500 and #1200 silicon carbide polishing powders are used for coarse grinding and cerium oxide powders are used for refined grinding and polishing. A thickness of the cover is generally 0.1 mm to 1.2 mm.

S160: Strengthening. An ion exchange process is performed in a molten-salt bath, and the glass is produced approximately at a temperature of 350° C. to 500° C. The first ion exchange is performed in a potassium nitrate ($KNO_3$) pure solution or a $KNO_3$/sodium nitrate ($NaNO_3$) mixed solution. Therefore, a first-layer surface stress CS1 is 60 MPa to 350 MPa, an exchange layer depth DOL1 is 20 μm to 150 μm, exchange is performed mainly based on ions Li and Na, and strengthening duration is 1 to 13 hours. After cooling, the $KNO_3$ pure solution or the $KNO_3$/$NaNO_3$ mixed solution are put for the second ion exchange, to form a surface compressive stress layer on an outer surface, strengthening duration is 10 minutes to 6 hours, and exchange is performed mainly based on ions K and Na. Therefore, a compressive stress CS is approximately 500 MPa to 1000 MPa, a depth of the surface compressive stress layer (DOL) is at least approximately 5 μm, a central tension region has a tension stress that is approximately 30 MPa to 120 MPa, and the thickness of the glass is approximately 0.1 millimeters (mm) to 1.2 mm.

In the descriptions of the present disclosure, it should be understood that "-" indicates a range between two values, and the range includes endpoints. For example: "A-B" indicates the range that is greater than or equal to A and less than or equal to B.

In the descriptions of this specification, the described specific features, structures, materials, or characteristics may be combined in a proper manner in any one or more of the embodiments or examples.

What is claimed is:
1. A microcrystalline glass comprising:
silicon dioxide ($SiO_2$) comprising first mass percentages of 55 percent (%) to 80%;
aluminum oxide ($Al_2O_3$) comprising second mass percentages of 5% to 20%;
sodium oxide ($Na_2O$) comprising third mass percentages that are less than or equal to 8%;
magnesium oxide (MgO) comprising fourth mass percentages that are less than or equal to 10%;
titanium dioxide ($TiO_2$) comprising fifth mass percentages that are less than or equal to 6%;
potassium oxide ($K_2O$) comprising sixth mass percentages that are less than or equal to 5%;
lithium oxide ($Li_2O$) comprising seventh mass percentages that are less than or equal to 10%;
zirconium dioxide ($ZrO_2$) comprising eighth mass percentages that are less than or equal to 5%;
phosphorus pentoxide ($P_2O_5$) comprising ninth mass percentages that are less than or equal to 5%; and
a magnesium aluminate ($MgAl_2O_4$) crystal comprising first volume percentages of 5% to 75%,
wherein second volume percentages of a glass phase in the microcrystalline glass is 25% to 95%.

2. The microcrystalline glass of claim 1, further comprising:
  a lithium disilicate ($Li_2Si_2O_5$) crystal comprising third volume percentages that are less than or equal to 30%; and
  a quartz and quartz solid solution comprising fourth volume percentages that are less than or equal to 30%.

3. The microcrystalline glass of claim 2, wherein the first volume percentages are 15% to 25%, wherein the third volume percentages are 10% to 15%, and wherein the fourth volume percentages are 10% to 20%.

4. The microcrystalline glass of claim 2, wherein the first volume percentages are 5% to 30%, wherein the third volume percentages are 10% to 30%, and wherein the fourth volume percentages are 5% to 30%.

5. The microcrystalline glass of claim 4, wherein a sum of the first volume percentages, the third volume percentages, and the fourth volume percentages is less than 50%.

6. The microcrystalline glass of claim 2, wherein the first volume percentages are 10% to 60%, wherein the third volume percentages are less than 5%, wherein the fourth volume percentages are less than 5%, and wherein the seventh mass percentages are less than or equal to 3%.

7. The microcrystalline glass of claim 6, wherein the fifth mass percentages are 2% to 6%, wherein the eighth mass percentages are less than or equal to 1%, and wherein the ninth mass percentages are less than or equal to 1%.

8. The microcrystalline glass of claim 1, wherein the first mass percentages are 60% to 70%.

9. The microcrystalline glass of claim 1, wherein the seventh mass percentages are 3% to 10%.

10. The microcrystalline glass of claim 1, wherein the second mass percentages are 8% to 15%.

11. The microcrystalline glass of claim 1, wherein the fifth mass percentages are 2% to 4.5%, wherein the eighth mass percentages are 1% to 2.5%, wherein the ninth mass percentages are 1% to 2.5%, and wherein a sum of the fifth mass percentages, the eighth mass percentages, and the ninth mass percentages is less than or equal to 8%.

12. The microcrystalline glass of claim 1, further comprising lanthanum oxide ($La_2O_3$) comprising tenth mass percentages that are less than or equal to 1%.

13. The microcrystalline glass of claim 1, wherein a sum of the seventh mass percentages and the sixth mass percentages is 3% to 12%.

14. The microcrystalline glass of claim 1, wherein a sum of the first mass percentages and the seventh mass percentages is 6 to 10 times the second mass percentages, and wherein a sum of the second mass percentages and the seventh mass percentages is 9 to 15 times the ninth mass percentages.

15. The microcrystalline glass of claim 1, wherein the fourth mass percentages are 5% to 9%, and wherein the third mass percentages are 3% to 8%.

16. The microcrystalline glass of claim 1, further comprising boron oxide ($B_2O_3$) comprising eleventh mass percentages that are less than or equal to 5%.

17. The microcrystalline glass of claim 1, further comprising one or more of calcium oxide (CaO), strontium oxide (SrO), zinc oxide (ZnO), or barium oxide (BaO), wherein twelfth mass percentages of the CaO are less than or equal to 3% when the microcrystalline glass comprises the CaO, wherein thirteenth mass percentages of the SrO are less than or equal to 3% when the microcrystalline glass comprises the SrO, wherein fourteenth mass percentages of the ZnO are less than or equal to 5% when the microcrystalline glass comprises the ZnO, wherein fifteenth mass percentages of the BaO are less than or equal to 5% when the microcrystalline glass comprises the BaO, and wherein a sum of the twelfth mass percentages, the thirteenth mass percentages, the fourteenth mass percentages, and the fifteenth mass percentages is less than or equal to 5%.

18. A transparent microcrystalline glass cover comprising microcrystalline glass, wherein the microcrystalline glass comprises:
  silicon dioxide ($SiO_2$) comprising first mass percentages of 55 percent (%) to 80%;
  aluminum oxide ($Al_2O_3$) comprising second mass percentages of 5% to 20%;
  sodium oxide ($Na_2O$) comprising third mass percentages that are less than or equal to 8%;
  magnesium oxide (MgO) comprising fourth mass percentages that are less than or equal to 10%;
  titanium dioxide ($TiO_2$) comprising fifth mass percentages that are less than or equal to 6%;
  potassium oxide ($K_2O$) comprising sixth mass percentages that are less than or equal to 5%;
  lithium oxide ($Li_2O$) comprising seventh mass percentages that are less than or equal to 10%;
  zirconium dioxide ($ZrO_2$) comprising eighth mass percentages that are less than or equal to 5%;
  phosphorus pentoxide ($P_2O_5$) comprising ninth mass percentages that are less than or equal to 5%; and
  a magnesium aluminate ($MgAl_2O_4$) crystal comprising first volume percentages of 5% to 75%,
  wherein second volume percentages of a glass phase in the microcrystalline glass are 25% to 95%.

19. An apparatus comprising:
a housing forming an accommodation space and comprising a crystalline phase of a microcrystalline glass, wherein the microcrystalline glass comprises:
  silicon dioxide ($SiO_2$) comprising first mass percentages of 55 percent (%) to 80%;
  aluminum oxide ($Al_2O_3$) comprising second mass percentages of 5% to 20%;
  sodium oxide ($Na_2O$) comprising third mass percentages that are less than or equal to 8%;
  magnesium oxide (MgO) comprising fourth mass percentages that are less than or equal to 10%;
  titanium dioxide ($TiO_2$) comprising fifth mass percentages that are less than or equal to 6%;
  potassium oxide ($K_2O$) comprising sixth mass percentages that are less than or equal to 5%;
  lithium oxide ($Li_2O$) comprising seventh mass percentages that are less than or equal to 10%;
  zirconium dioxide ($ZrO_2$) comprising eighth mass percentages that are less than or equal to 5%;
  phosphorus pentoxide ($P_2O_5$) comprising ninth mass percentages that are less than or equal to 5%; and
  a magnesium aluminate ($MgAl_2O_4$) crystal comprising first volume percentages of 5% to 75%,
  wherein second volume percentages of a glass phase in the microcrystalline glass are 25% to 95%; and
a component disposed in the accommodation space.

20. A microcrystalline glass production method comprising:
  proportioning ingredients based on component mass fractions of a microcrystalline glass, wherein the ingredients comprise silicon dioxide ($SiO_2$), aluminum oxide ($Al_2O_3$), sodium oxide ($Na_2O$), magnesium oxide (MgO), titanium dioxide ($TiO_2$), potassium oxide ($K_2O$), lithium oxide ($Li_2O$), zirconium dioxide ($ZrO_2$), and phosphorus pentoxide ($P_2O_5$), wherein the component mass fractions comprise:

silicon dioxide (SiO$_2$) comprising first mass percentages of 55 percent (%) to 80%;
aluminum oxide (Al$_2$O$_3$) comprising second mass percentages of 5% to 20%;
sodium oxide (Na$_2$O) comprising third mass percentages that are less than or equal to 8%;
magnesium oxide (MgO) comprising fourth mass percentages that are less than or equal to 10%;
titanium dioxide (TiO$_2$) comprising fifth mass percentages that are less than or equal to 6%;
potassium oxide (K$_2$O) comprising sixth mass percentages that are less than or equal to 5%;
lithium oxide (Li$_2$O) comprising seventh mass percentages that are less than or equal to 10%;
zirconium dioxide (ZrO$_2$) comprising eighth mass percentages that are less than or equal to 5%;
phosphorus pentoxide (P$_2$O$_5$) comprising ninth mass percentages that are less than or equal to 5%; and
a magnesium aluminate (MgAl$_2$O$_4$) crystal comprising first volume percentages of 5% to 75%,
wherein second volume percentages of a glass phase in the microcrystalline glass are 25% to 95%;
smelting and clarifying the ingredients at a temperature of 1300 degrees Celsius (° C.) to 1700° C. to obtain a high-temperature glass raw liquid;
removing bubbles and foreign matter from the high-temperature glass raw liquid to obtain a purified liquid;
forming the purified liquid into a glass body using one of a press-and-delay method, a melt casting method, a float method, a melt overflow method, or a sintering method to obtain a formed glass body;
performing coarse annealing on the formed glass body at a temperature of 400° C. to 800° C. to obtain a coarse annealed glass body;
nucleating, through thermal processing for 0.5 to 1 hour at a temperature of 500° C. to 600° C., the coarse annealed glass body to obtain a nucleated glass body; and
performing crystallization on the nucleated glass body through thermal processing for 0.5 to 1 hour at a temperature of 650° C. to 800° C. to obtain a transparent microcrystalline glass.

\* \* \* \* \*